United States Patent
Niwa et al.

(10) Patent No.: US 8,417,405 B2
(45) Date of Patent: Apr. 9, 2013

(54) DRIVING SUPPORT DEVICE, METHOD, AND PROGRAM

(75) Inventors: Toshiaki Niwa, Okazaki (JP); Yoshinori Ono, Nukata-gun (JP)

(73) Assignee: Aisin AW Co., Ltd., Anjo (JP)

( * ) Notice: Subject to any disclaimer, the term of this patent is extended or adjusted under 35 U.S.C. 154(b) by 301 days.

(21) Appl. No.: 12/966,462

(22) Filed: Dec. 13, 2010

(65) Prior Publication Data
US 2011/0144847 A1 Jun. 16, 2011

(30) Foreign Application Priority Data
Dec. 16, 2009 (JP) ................................. 2009-284816

(51) Int. Cl.
*B60L 9/00* (2006.01)
(52) U.S. Cl.
USPC ...................... 701/22; 180/65.27; 180/65.285
(58) Field of Classification Search .................. 701/22; 180/65.27, 65.285; 903/903, 907
See application file for complete search history.

(56) References Cited

U.S. PATENT DOCUMENTS

| | | | |
|---|---|---|---|
| 2005/0200197 | A1 | 9/2005 | Crombez et al. |
| 2006/0047400 | A1 | 3/2006 | Prakash et al. |
| 2007/0124052 | A1 | 5/2007 | Prakash et al. |
| 2010/0179714 | A1* | 7/2010 | Tani et al. .................. 701/22 |

FOREIGN PATENT DOCUMENTS

| | | |
|---|---|---|
| DE | 102 34 064 A1 | 2/2004 |
| GB | 2 417 532 A | 3/2006 |
| JP | A-2007-221889 | 8/2007 |

OTHER PUBLICATIONS

Mar. 15, 2011 European Search Report issued in EP 10 19 1862.

\* cited by examiner

*Primary Examiner* — Thomas Black
*Assistant Examiner* — Luke Huynh
(74) *Attorney, Agent, or Firm* — Oliff & Berridge, PLC (57) ABSTRACT

Driving support devices, methods, and programs determine a target position ahead of a vehicle and a target vehicle speed at the target position. The devices, methods, and programs divide a section between a deceleration start position to start deceleration of the vehicle and the target position into a plurality of sections and set target charging electric power to different values for respective sections forming the plurality of sections to reduce a speed of the vehicle to the target vehicle speed at the target position. The devices, methods, and programs control an electric generator installed in the vehicle to generate the regeneration brake in the respective sections forming the plurality of sections based on the set charging electric power values and charge the battery with the target charging electric power generated in each of the respective sections.

16 Claims, 6 Drawing Sheets

DRIVING SUPPORT DEVICE, METHOD, AND PROGRAM

INCORPORATION BY REFERENCE

The disclosure of Japanese Patent Application No. 2009-284816, filed on Dec. 16, 2009, including the specification, drawings, and abstract thereof, is incorporated herein by reference in its entirety.

BACKGROUND

1. Related Technical Fields

Related technical fields include driving support devices, methods, and programs that provide support for charging a battery with high charging efficiency while keeping a comfortable ride from worsening.

2. Related Art

Conventionally, a technology that decelerates a vehicle by regeneration brake and collects braking energy in the battery, is known. For example, Japanese Patent Application Publication No. JP-A-2007-221889 discloses that a battery acceptable power Win (corresponding to charging electric power) is given by braking force Fbr×velocity V (×efficiency). In addition, in order to charge the battery with maximum electric power while preventing heat generation of the battery and worsening of performance, it is generally known that making the charging electric power constant is effective.

SUMMARY

According to the conventional technology, when decelerating the vehicle by the regeneration brake, it is effective to generate the regeneration brake that charges the battery with a constant level of the charging electric power. According to this configuration, when braking by the regeneration brake is performed, braking force operated on the vehicle is in inverse proportion to a vehicle speed. Consequently, in this configuration, when reducing the vehicle speed through the braking by the regeneration brake, the braking force operated on the vehicle drastically increases. Therefore, ride feeling gets worse as the vehicle speed decreases.

In view of the problems described above, exemplary implementations of the broad inventive principles described herein provide a technology to collect energy while suppressing an excessive increase of the braking force.

According to exemplary implementations, the section between a deceleration start position of the vehicle and a target position is divided into a plurality of sections, different values of target charging electric power are set to respective sections forming the plurality of sections, and the vehicle is decelerated to the target vehicle speed by generating the regeneration brake that charges the battery with the target charging electric power in the respective sections forming the plurality of sections.

Regarding the regeneration brake that sets a certain target charging electric power, it is possible to consider that the charging electric power of the battery is equal to (or proportional to) a product of the braking force operated on the vehicle and the vehicle speed, as described above. Consequently, when performing braking by generating the regeneration brake that charges the battery with a single level of the target charging electric power from the deceleration start position to the target position, the braking force increases in inverse proportion to the vehicle speed. As a result, the braking force becomes excessively large in the course of reducing the vehicle speed. Here, the section between the deceleration start position of the vehicle and the target position is divided into a plurality of sections, different values of the target charging electric power are set to the respective sections, and the vehicle speed is reduced to the target vehicle speed. Consequently, it is possible to collect the energy while suppressing the excessive increase of the braking force, compared to when generating the regeneration brake that charges the battery with a single level of the target charging electric power as described above.

Here, a target determination unit is not limited provided that it can determine the target position ahead of the vehicle and the target vehicle speed at the target position. That is, it is only necessary to define as the target position a position on a road where the vehicle speed should be the target vehicle speed (or less than the target vehicle speed) and determine the target position being associated with the target vehicle speed. The target position may be associated with a feature on the road such as a position of a stop line where the target vehicle speed is 0 km/h or a start position of a slow traffic section where vehicles should travel at a certain vehicle speed or less. Or, the target vehicle speed may be determined according to a signal indicated by a traffic light, and the stop line corresponding to the traffic light may be defined as the target position if the vehicle should be stopped. Various types of configurations can be applied.

A target charging electric power setting unit is not limited provided that it can set the plurality of sections and set the target charging electric power for the respective sections such that the vehicle speed can be reduced to the target vehicle speed between the deceleration start position and the target position. That is, it is only necessary to set lengths of the respective sections and values of the target charging electric power for the respective sections such that the vehicle speed can be reduced to the target vehicle speed in a condition where a maximum value of the braking force becomes smaller compared to when generating the regeneration brake that charges the battery with a single level of the target charging electric power as described above. The deceleration start position is only necessary to be a position to start deceleration by the regeneration brake in the vehicle, and may be determined based on a distance to the target position or based on an operation (for example, the operation on a pedal for instructing deceleration start) of the driver in the vehicle. Various types of configurations can be applied. In addition, it is only necessary that the number of divided sections is two or more and upper limits of the braking force are suppressed by setting the target charging electric power for the respective sections. Therefore, the section may be divided into a predetermined number, the number of divided sections may be increased as the distance between the deceleration start position and the target position increases, or the section may be divided into the number as small as possible provided that the upper limit of a predetermined braking force is not exceeded.

A deceleration control unit is not limited provided that it can perform deceleration control such that the vehicle speed at the target position becomes the target vehicle speed by generating the regeneration brake that charges the battery with the target charging electric power set for the respective sections. That is, as the target charging electric power for the respective sections is set such that the vehicle speed at the target position becomes the target vehicle speed, the deceleration control unit controls an electric generator to generate the regeneration brake and to charge the battery with the target charging electric power that is associated with the respective sections in the course of traveling the respective sections.

The regeneration brake is only necessary to be realized by controlling the electric generator installed in the vehicle. That is, the regeneration brake is only necessary to be realized by control to transmit rotation of a wheel to the electric generator and cause the braking force to be operated on the vehicle while charging the battery connected to the electric generator. Within this scope, various methods can be applied for a driving method of the vehicle and a relation between the electric generator and an engine. The inventive principles described herein may be applied to a hybrid vehicle that is driven by any or both of the engine and the electric generator as a motor, or an electric vehicle not provided with the engine.

The target charging electric power may be set to be larger for a section that is positioned closer to the deceleration start position among the respective sections forming the plurality of sections. That is, the target charging electric power may be set to be larger for a section where the vehicle speed is high. As indicated above, when generating the regeneration brake that charges the battery with a certain target charging electric power, it can be considered that the charging electric power is equal to (or proportional to) the product of the braking force operated on the vehicle and the vehicle speed. Consequently, when a certain vehicle speed is assumed, the larger the target charging electric power is, the larger the braking force can be generated. When the braking force operated on the vehicle is large, a distance necessary for reducing the vehicle speed becomes shorter compared to when the braking force is small. Consequently, by setting the target charging electric power such that the target charging electric power is larger for a section that is positioned closer to the deceleration start position among the respective sections forming the plurality of sections, the vehicle speed can be effectively reduced at an early stage, without unnecessarily elongating the distance for decelerating the vehicle.

Further, when the vehicle speed is high, energy loss by air resistance or the like is high compared to when the vehicle speed is low. Therefore, the energy that cannot be collected by the regeneration brake increases as the period of time when the vehicle speed is high increases. However, by setting the target charging electric power to be larger for a section where the vehicle speed is higher, the period of time when the vehicle speed is high can be shortened. As a result, it is possible to reduce the energy loss by the air resistance or the like, and increase the energy that can be collected by the regeneration brake.

In addition, the target charging electric power relating to the performance of the battery may be set. For example, the section between the deceleration start position of the vehicle and the target position may be divided into a first section and a second section being located ahead of the first section, the target charging electric power for the first section may be set to maximum charging electric power with which the battery can be charged, and the target charging electric power for the second section may be set to continuous charging electric power with which the battery can be continuously charged without degrading the performance of the battery. That is, the regeneration brake that charges the battery with the maximum charging electric power is generated in a section just after a deceleration start, and the regeneration brake that charges the battery with the continuous charging electricity for maintaining the performance of the battery is generated in the next section.

In a configuration in which the regeneration brake that charges the battery with a certain level of the electric power is generated by controlling the electric generator, the continuous charging electric power with which the battery can be continuously charged without degrading the performance of the battery can be defined. The continuous charging electric power is normally smaller than the maximum charging electric power with which the battery can be charged, and the performance of the battery is maintained by limiting the charging electric power for the battery to the electric power with which temperature increase in the battery can be prevented.

In this configuration, by setting the target charging electric power for the first section in which the vehicle speed is relatively higher than that in the second section to the maximum charging electric power, the vehicle speed can be reduced early in the first section in which the vehicle speed is high, and a period in a state where the energy loss is large can be suppressed as short as possible. Further, by setting the target charging electric power for the second section, which is a section after the vehicle speed has been reduced, to the continuous charging electric power, degradation in the performance of the battery can be suppressed after the vehicle speed has been reduced.

The lengths of the first section and the second section may be determined according to the distance between the deceleration start position and the target position. For example, if the distance between the deceleration start position and the target position is shorter than the distance for reducing the vehicle speed to the target vehicle speed only with the braking by the regeneration brake that charges the battery with the continuous charging electric power, the length of the first section may be defined with a minimum length required for performing the braking by the regeneration brake that charges the battery with the maximum charging electric power, and the rest may be defined as the second section. In addition, if the battery can be cooled in the course of charging the battery with the continuous charging electric power, the length of the second section may be set such that temperature increased by charging the battery with the maximum charging electric power can be lowered in the course of charging the battery with the continuous charging electric power.

Exemplary implementations provide, a technique for setting different levels of the target charging electric power for the respective sections forming the plurality of sections and performing the braking by the regeneration brake in the respective sections, can also be applied in the forms of a program and a method. In addition, the device, the method, and the program described above may be implemented in a stand-alone device, and it may be implemented through parts used in common with respective components provided in the vehicle. For example, it is possible to provide a navigation device that is equipped with the device described above, and to provide the method and the program as well. The inventive principles described herein can also be applied to modified implementations as desired, such as by providing a portion of it in the form of software and a portion of it in the form of hardware, for example. The inventive principles may also be practiced in the form of a storage medium for a program that controls the device. The software storage medium may be a magnetic storage medium or a magneto optical storage medium. Furthermore, any storage medium that is developed henceforth can also be considered to be exactly the same.

DETAILED DESCRIPTION OF EXEMPLARY IMPLEMENTATIONS

Exemplary implementations are described below, in the following order: (1) structure of navigation device, (2) driving support processing, (3) variations and other examples:

I. Structure of Navigation Device

Figure 1:
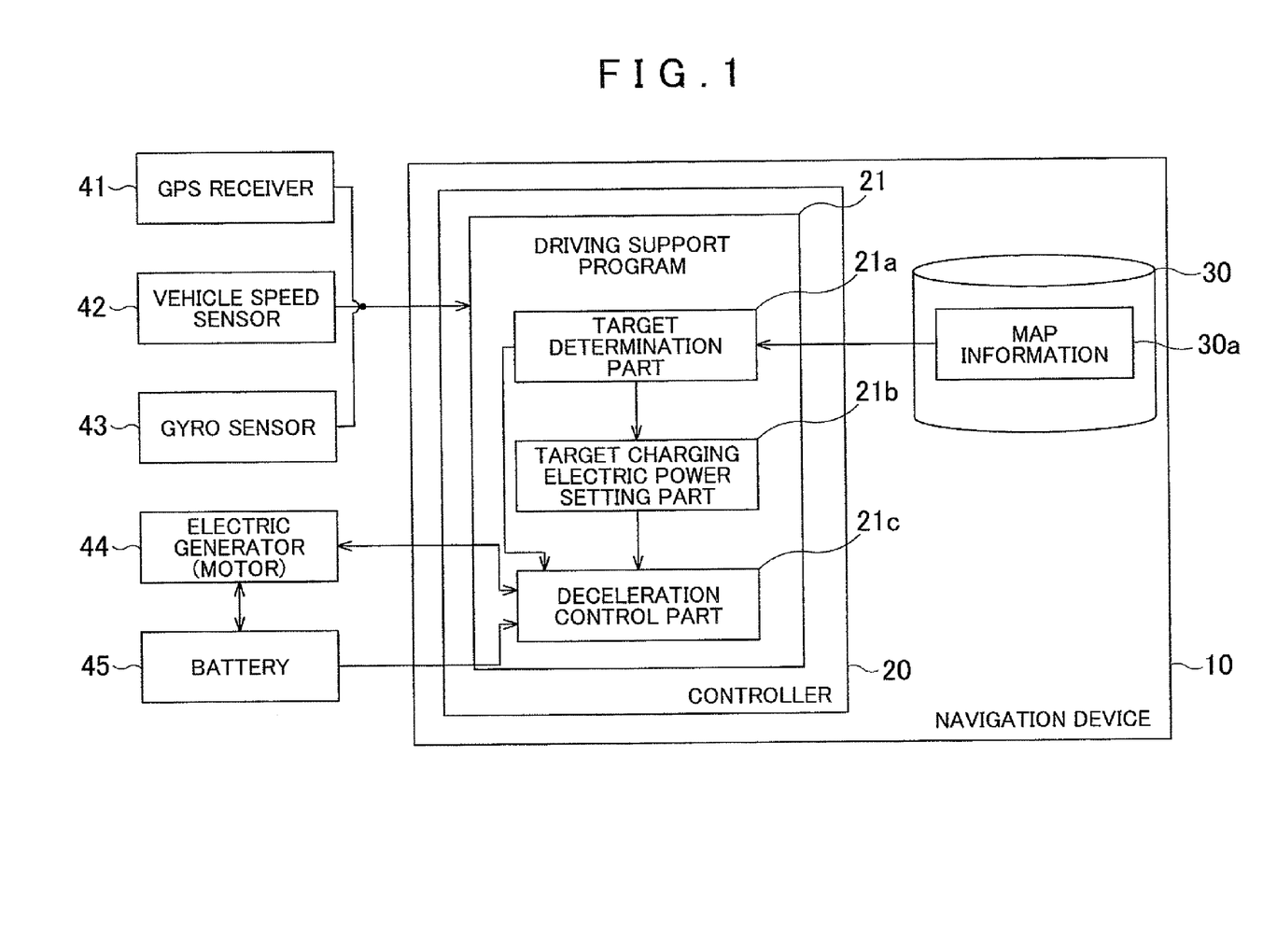
FIG. 1 shows a block diagram of a navigation device including a driving support device.

FIG. 1 is a block diagram showing a structure of a navigation device 10 including a driving support device. The navigation device 10 includes a controller 20 and a storage medium 30. The controller 20 includes a CPU, a RAM, a ROM, and the like. Programs stored in the storage medium 30 and the ROM can be executed in the controller 20. In the present example, a driving support program 21 can be executed as such program. The driving support program 21 is executed while the controller 20 is executing navigation processing.

A vehicle in the present example is provided with a GPS receiver 41, a vehicle speed sensor 42, a gyro sensor 43, an electric generator 44, and a battery 45. The controller 20 realizes functions by the driving support program 21 using the respective parts as needed.

The GPS receiver 41 receives radio waves from a GPS satellite and outputs information for calculating a current position of the vehicle via an interface (not shown). The controller 20 acquires the signal to determine the current position of the vehicle. The vehicle speed sensor 42 outputs the signal corresponding to a rotating speed of a wheel provided in the vehicle. The controller 20 acquires the signal via the interface (not shown) to determine a current speed of the vehicle. The gyro sensor 43 outputs the signal corresponding to an angular speed operated on the vehicle. The controller 20 acquires the signal via the interface (not shown) to determine a travel direction of the vehicle. The vehicle speed sensor 42 and the gyro sensor 43 are utilized to adjust the current position of the vehicle determined by the output signal of the GPS receiver 41. In addition, the current position of the vehicle is adjusted based on a travel track of the vehicle as appropriate.

The electric generator 44 is provided with a rotator that is connected to an axle that drives a wheel through a gear (not shown). The electric generator 44 is a device that generates electric power when the rotator of the electric generator 44 rotates according to rotation of the wheel, and charges the battery 45 with the generated electric power. The electric generator 44 is connected to the controller 20 via the interface (not shown). The controller 20 can generate regeneration brake and adjust the braking force by controlling a state of electric generation through outputting a control signal to the electric generator 44.

The battery 45 is connected to the electric generator 44, is charged with the electric power generated by the electric generator 44, supplies the charged electric power to the electric generator 44, and causes the electric generator 44 to function as a motor. That is, the electric generator 44 in the present example also includes a function as the motor for driving the vehicle. When the electric generator 44 rotates in receiving the supply of the electric power from the battery 45, the rotation is transmitted to the wheel through the gear (not shown) and the vehicle goes forward or backward. In addition, the vehicle is a hybrid vehicle provided with an engine (not shown), and driven by any one or both of the engine and the electric generator 44 as the motor. However, the vehicle may be an electric vehicle without the engine.

In addition, the battery 45 is connected to the controller 20 via the interface (not shown). When the controller 20 outputs the control signal to the battery 45, the signal indicating a state (a temperature and a voltage) of the battery 45 is output from the battery 45. The controller 20 determines the state of the battery 45 based on the signal.

The driving support program 21 sets a plurality of levels of target charging electric power to reduce a vehicle speed to a target vehicle speed. In order to realize a function to generate the regeneration brake that charges the battery 45 with the respective levels of the target charging electric power, the driving support program 21 includes a target determination part 21a, a target charging electric power setting part 21b, and a deceleration control part 21c. In addition, map information 30a is previously stored in the storage medium 30.

The map information 30a includes node data indicating a node set on a road to be traveled by the vehicle, shape interpolating point data for determining a shape of the road between nodes, link data indicating a connection of nodes, data indicating a feature existing on the road or in the vicinity of the road (a stop line or a white line on the road, a pedestrian crossing, or the like), and the like. In the present example, in case that it is necessary to stop the vehicle just before the feature, a position to stop the vehicle is defined as a target position, and the data indicating the feature is associated with data indicating the target position. In addition, in the present example, the target vehicle speed is 0 km/h because the target position is a position where the vehicle is necessary to stop.

The target determination part 21a is a module that causes the controller 20 to realize a function for determining the target position ahead of the vehicle and the target vehicle speed at the target position. That is, by the processing of the target determination part 21a, the controller 20 determines the current position of the vehicle based on the output signal of the GPS receiver 41, the vehicle speed sensor 42, the gyro sensor 43, and the like, and determines the target position existing within a predetermined area ahead of the current position by referring to the map information 30a. The target vehicle speed is fixed to 0 km/h.

The target charging electric power setting part 21b is a module that causes the controller 20 to realize a function for dividing a section between a deceleration start position of the vehicle and the target position into a plurality of sections, and setting the target charging electric power to different values for respective sections forming the plurality of sections. The target charging electric power is electric power with which the battery should be charged to generate the regeneration brake that reduces the vehicle speed to the target vehicle speed between the deceleration start position and the target position. In the present example, by the processing of the target charging electric power setting part 21b, the controller 20 sets a combination of lengths of the plurality of sections between the deceleration start position and the target position and the target charging electric power with which the battery should be charged in the respective sections, such that the vehicle can be decelerated from the current vehicle speed to the target vehicle speed by the regeneration brake.

In the present example, the controller 20 sets the target charging electric power to be larger for a section that is positioned closer to the deceleration start position among the respective sections forming the plurality of sections. Specifically, the controller 20 divides the section between the deceleration start position of the vehicle and the target position into a first section and a second section being located ahead of the first section, and sets the electric power such that the target charging electric power for the first section is larger than the target electric power for the second section.

The deceleration control part 21*c* is a module that causes the controller 20 to realize a function for decelerating the vehicle such that the vehicle speed at the target position becomes the target vehicle speed, by generating the regeneration brake that charges the battery with the target charging electric power in the respective sections forming the plurality of sections. That is, in the course of traveling each of the first section and the second section, the controller 20 outputs a control signal to the electric generator 44 to generate the regeneration brake and to charge the battery 45 with the target charging electric power. As a result, the braking force to be generated between the deceleration start position and the target position in the course of traveling the respective sections is operated on the vehicle, thereby decelerating the vehicle such that the vehicle speed at the target position becomes the target vehicle speed. According to the above configuration, the battery 45 is charged with different levels of the target charging electric power in the first section and the second section.

Generally, it can be considered that charging electric power of the battery is equal to (or proportional to) a product of the braking force operated on the vehicle and the vehicle speed. Consequently, when performing braking by generating the regeneration brake that charges the battery with a certain level of the target charging electric power, the braking force increases in inverse proportion to the vehicle speed. As a result, the braking force becomes excessively large in the course of reducing the vehicle speed.

However, in the present example, the section between the deceleration start position of the vehicle and the target position is divided into the first section and the second section, and the target charging electric power is set to different levels for the respective sections to reduce the vehicle speed to the target vehicle speed. Consequently, it becomes possible to collect energy while suppressing excessive increase of the braking force, compared to when generating the regeneration brake that charges the battery with a single level of the target charging electric power as described above.

Further, in the present example, the target charging electric power for the first section where the vehicle speed is high is set larger than that for the second section. In case of a certain vehicle speed, the larger the target charging electric power is, the larger the braking force can be generated. In addition, when the braking force operated on the vehicle is large, a distance necessary for reducing the vehicle speed becomes short compared to when the braking force is small. Consequently, by setting the target charging electric power for the first section to be larger than the target charging electric power for the second section, it is possible to effectively reduce the vehicle speed in an early stage, without needlessly enlarging a distance necessary for decelerating the vehicle.

In addition, when the vehicle speed is high, energy loss due to air resistance or the like is large compared to when the vehicle speed is low. Therefore, the energy that cannot be collected by the regeneration brake increases as a period of time when the vehicle speed is high increases. However, if the target charging electric power for the first section where the vehicle speed is high is set larger than the target charging electric power for the second section, the period of time when the vehicle speed is high can be shortened. Therefore, the energy loss due to air resistance or the like can be reduced, thereby being able to increase the energy that can be collected by the regeneration brake.

II. Driving Support Processing

Figure 2:
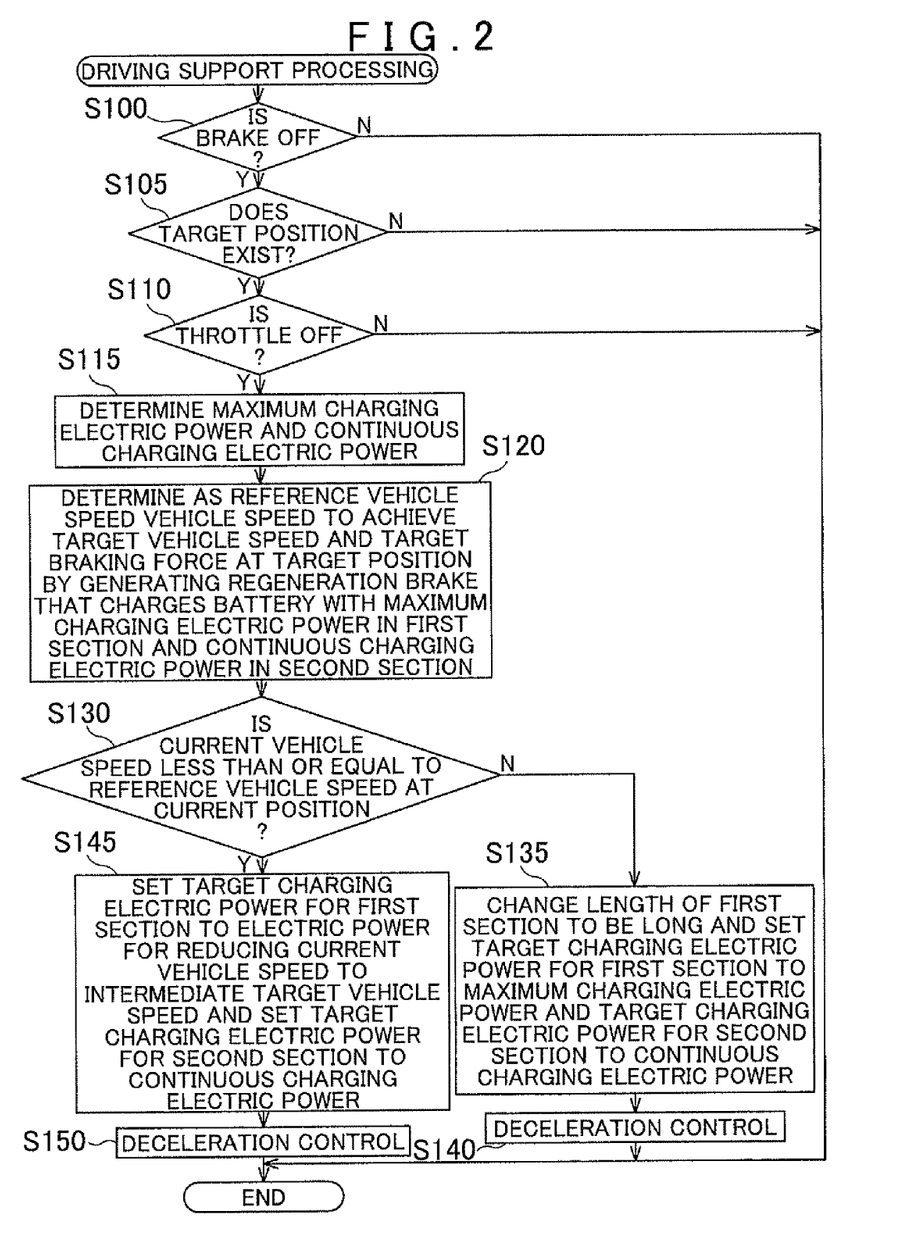
FIG. 2 is a flow chart showing the driving support processing.

Next, an exemplary method of driving support processing is described with reference to FIG. 2. FIG. 2 is a flowchart showing an algorithm of a method for driving support processing. The exemplary method may be implemented, for example, by one or more components of the above-described navigation device 10. For example, the exemplary method may be implemented by the CPU of the controller 20 executing a computer program stored in the RAM, ROM, or storage medium 30. However, even though the exemplary structure of the above-described navigation device 10 may be referenced in the description, it should be appreciated that the structure is exemplary and the exemplary method need not be limited by any of the above-described exemplary structure. The driving support processing may be executed at predetermined intervals (for example, intervals of 100 ms) while the vehicle is traveling.

In the driving support processing, the controller 20 judges whether or not a brake is off (Step S100). That is, the controller 20 outputs the control signal to a braking part (not shown) to determine an operating volume on a braking force adjustment pedal. If the braking force adjustment pedal is not operated, the controller 20 judges that the brake is off. If it is not judged that the brake is off at Step S100, the processing of Step S105 and subsequent steps are skipped. That is, the driving support is not performed.

If it has been judged that the brake is off at Step S100, the controller 20 judges by the processing of the target determination part 21*a* whether or not the target position exists within a predetermined area ahead of the vehicle (Step S105). That is, the controller 20 determines the current position of the vehicle based on the output signals of the GPS receiver 41, the vehicle speed sensor 42, the gyro sensor 43, and refers to the map information 30*a* to extract the data indicating the feature within the predetermined area ahead of the vehicle. If the data indicating the feature is associated with the data indicating the target position, the controller judges that the target position exists within the predetermined area ahead of the vehicle. If it is not judged that the target position exists at Step 105, the processing of Step S110 and subsequent steps are skipped. That is, the driving support is not performed.

Next, the controller 20 judges whether or not a throttle is off (Step S110). That is, the controller 20 outputs the control signal to a throttle controller for adjusting opening level of a throttle valve (not shown) to determine the opening level of the throttle valve. If the opening level of the throttle valve is 0, it has been judged that the throttle is off. If it is not judged that the throttle is off at Step S110, the processing of Step S115 and subsequent steps are skipped. That is, the driving support is not performed.

Next, the controller 20 determines maximum charging electric power and continuous charging electric power to the battery 45 (Step S115). Here, the maximum charging electric power is a maximum value of electric power with which the battery 45 can be charged, and determined according to the performance and the status of the battery 45, and the like. The controller 20 outputs the control signal to the battery 45 to determine the status of the battery 45 and determine the maximum charging electric power. The continuous charging electric power is electric power with which the battery can be continuously charged without degrading the performance of the battery, and a predefined value is determined as the continuous charging electric power by the controller 20. The maximum charging electric power is larger than the continuous charging electric power.

Next, the controller 20 determines as a reference vehicle speed the vehicle speed to achieve the target vehicle speed at the target position by generating the regeneration brake that charges the battery 45 with the maximum charging electric power in the first section and with the continuous charging electric power in the second section (Step S120). That is, in the present example, transition of the vehicle speed, on the assumption that the battery 45 is charged with the maximum charging electric power in the first section and with the continuous charging electric power in the second section, is determined as the reference vehicle speed. At Step S135 or S145 described later, by comparing between the reference vehicle speed and the current vehicle speed, the lengths of the first section and the second section and the target charging electric power in the respective sections are adjusted.

Figure 3A:
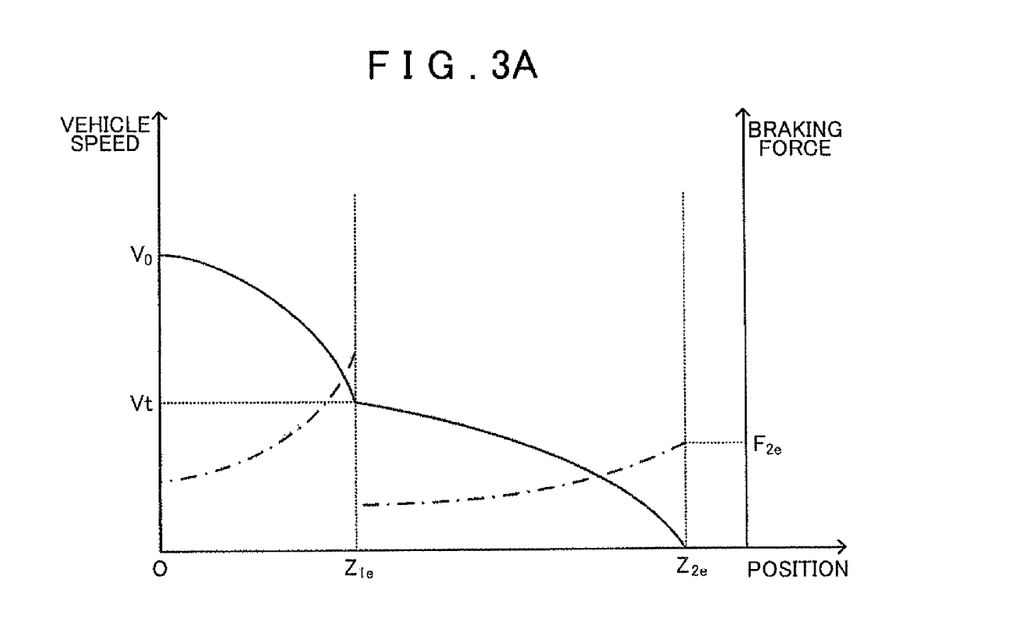
FIG. 3A is a view showing a transition of vehicle speed and FIG. 3B is a view showing a transition of charging electric power.
Figure 3B:
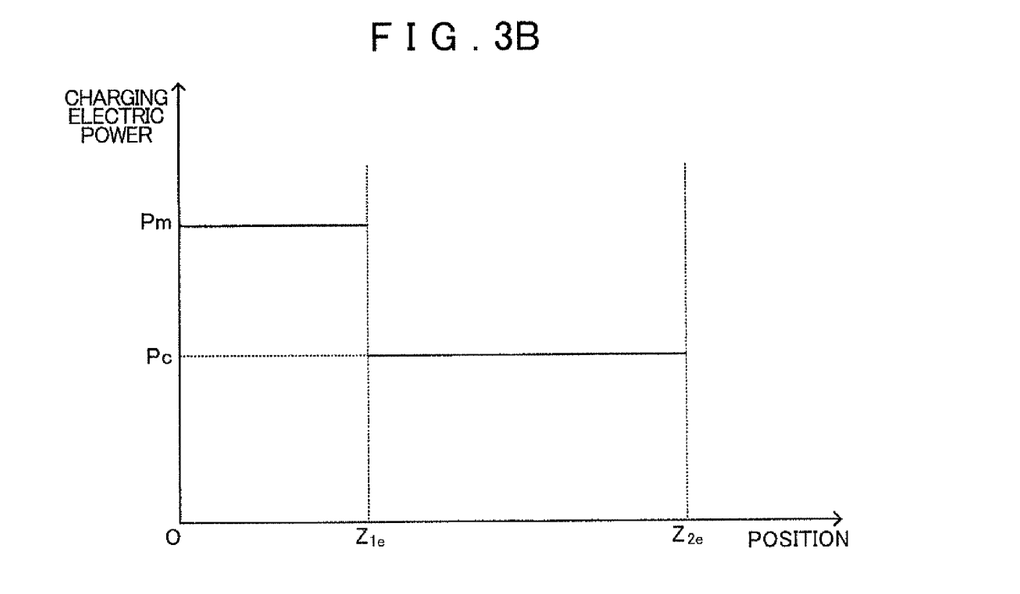

FIG. 3A is an exemplary view of determination of the reference vehicle speed. In FIG. 3A, a horizontal axis indicates the position, and a vertical axis indicates the vehicle speed and the braking force. A solid line indicates the reference speed and a dashed-dotted line indicates the braking force. In the present example, an original point O is the current position of the vehicle, the section from the original point O to a position $Z_{1e}$ is the first section, and the section from the position $Z_{1e}$ to a position $Z_{2e}$ is the second section. In FIG. 3B, while the horizontal axis indicates the same as FIG. 3A, the vertical axis indicates the charging electric power. Pm (W) denotes the maximum charging electric power and Pc (W) denotes the continuous charging electric power.

The reference vehicle speed and the braking force as shown in FIG. 3A are determined by repeating the processing for determining the reference vehicle speed at every unit of time and the transition of acceleration according to a condition to charge the battery 45 with the charging electric power for the respective sections. First, the controller 20 determines the braking force at the target position based on the continuous charging electric power Pc. In the present example, it is considered that the continuous charging electric power Pc that is the charging electric power for the battery is equal to the product of the braking force operated on the vehicle and the vehicle speed. However, in order to avoid directly utilizing 0 km/h as the target vehicle speed, the vehicle speed at the target position is defined as a predetermined vehicle speed $V_{2e}$ (for example, 1 km/h) that is quite close to 0. A braking force $F_{2e}$ at the target position $Z_{2e}$ is determined by dividing the continuous charging electric power Pc by the predetermined vehicle speed $V_{2e}$. As a result, the braking force at the target position $Z_{2e}$ is set to $F_{2e}$, and the reference vehicle speed is set to the predetermined vehicle speed $V_{2e}$. Here, the braking force is defined under the condition that a direction ahead of the vehicle is positive. Therefore, the braking force $F_{2e}$ is a negative number.

Next, the controller 20 determines the reference speed at a unit of time before that is required for achieving the above reference vehicle speed and braking force at the target position $Z_{2e}$. That is, as a value acquired by dividing the braking force $F_{2e}$ at the target position by a weight of the vehicle is an acceleration to be operated on the vehicle (a negative acceleration under the condition that a direction ahead of the vehicle is positive), the reference vehicle speed at the unit of time before is determined by adding the product of the acceleration and a negative unit of time that indicates going back into the past into the predetermined vehicle speed $V_{2e}$ that corresponds to the target speed. In addition, the position backward in relation to the travel direction by a distance acquired by multiplying the reference vehicle speed by the unit of time is defined as the position of the vehicle at the unit of time before.

As described above, when considering that the product of the braking force operated on the vehicle and the vehicle speed is equal to the continuous charging electric power, the braking force operated on the vehicle is defined with a value acquired by dividing the continuous charging electric power by the vehicle speed. Therefore, as described above, after calculating the reference vehicle speed at the unit of time before, the braking force at the unit of time before can be determined by dividing the continuous charging electric power by the reference vehicle speed. By repeating this processing, the reference vehicle speed and the braking force at each position can be determined.

For example, in order to realize that the target vehicle speed and the braking force at the target position $Z_{2e}$ become $V_{2e}$ and $F_{2e}$ respectively when the electric generator 44 charges the battery 45 with the continuous charging electric power Pc, the controller 20 calculates a reference vehicle speed $V_{21}$ at the unit of time before as $V_{2e}+(-T)\times(F_{2e}/M)$ (km/h). Here, T represents a length of the unit of time. In addition, the controller 20 determines the position of the vehicle at the unit of time before as a position $Z_{21}$ (not shown) that is the position backward in relation to the travel direction by a distance $V_{21} \times T$ (m) from the target position $Z_{2e}$. As a result, the reference vehicle speed at the position $Z_{21}$ is determined as $V_{21}$. The controller 20 determines a braking force $F_{21}$ at the position $Z_{21}$ as $(-Pc/V_{21})$ (N).

Further, the controller 20 defines an acceleration $a_{21}$ that is operated on the vehicle at the position $Z_{21}$ as $(-Pc/(V_{21} \cdot M))$ (m/s$^2$) and determines a reference vehicle speed $V_{22}$ of the vehicle at the unit of time before from the status at the position $Z_{21}$ as $V_{21}+(-T)\times(-Pc/(V_{21} \cdot M))$. Further, the controller 20 determines the position of the vehicle at the unit of time before as a position $Z_{22}$ that is the position backward in relation to the travel direction by a distance $V_{22} \times T$ from the position $Z_{21}$. The controller 20 repeats the above processing until the reference vehicle speed becomes an intermediate target vehicle speed Vt (km/h) and determines the position where the reference vehicle speed becomes the intermediate target vehicle speed Vt as the position $Z_{1e}$. Here, the intermediate target vehicle speed Vt is a maximum value in a range of the vehicle speed that is previously determined as the vehicle speed which does not give a driver a discomfort feeling even when the braking force has discontinuously changed. Consequently, even when a discontinuous change in the braking force has occurred at the position $Z_{1e}$, the change does not give the driver the discomfort feeling. In addition by setting the intermediate target vehicle speed Vt to the maximum value in the range of the vehicle speed that is previously determined as the vehicle speed which does not give the driver the discomfort feeling, it is possible to set a period, in which the continuous charging electric power Pc is the target electric power, to be long. The intermediate target vehicle speed Vt can be determined in various kinds of methods. For example, the intermediate target vehicle speed Vt can be set to the maximum value or less in the range of the vehicle speed that is determined as the vehicle speed which does not give more than a certain percentage of drivers the discomfort feeling in the experiment to a sufficient number of drivers.

Next, the controller 20 determines the transition of the reference vehicle speed and the braking force when going back into the past from the position $Z_{1e}$ in the state that the electric generator 44 charges the battery 45 with the maximum charging electric power Pm. That is, the controller 20 calculates a reference vehicle speed $V_{11}$ at the unit of time before from the position $Z_{1e}$ as a reference point as $Vt+(-T) \times (F_{1e}/M)$ (km/h). Here, $F_{1e}$ is the braking force at the position $Z_{1e}$ that was determined by dividing the maximum charging electric power Pm by the intermediate target vehicle speed Vt. In addition, the controller 20 determines the position of the vehicle at the unit of time before using the position $Z_{1e}$ as the reference point as a position $Z_{11}$ (not shown) that is the position backward in relation to the travel direction by a distance $V_{11} \times T$ (m) from the position $Z_{1e}$. As a result, the reference vehicle speed at the position $Z_{11}$ is determined as $V_{11}$, and the controller 20 determines a braking force $F_{11}$ at the position $Z_{11}$ as $(-Pm/V_{11})$ (N).

Further, the controller 20 defines an acceleration $a_{1l}$ that is operated on the vehicle at the position $Z_{11}$ as $(-Pm/(V_{11} \cdot M))$ and determines a reference vehicle speed $V_{12}$ of the vehicle at the unit of time before from the status at the position $Z_{11}$ as $V_{11}+(-T) \times (-Pm/(V_{11} \cdot M))$. Further, the controller 20 determines the position of the vehicle at the unit of time before as a position $Z_{12}$ that is the position backward in relation to the travel direction by a distance $V12 \times T$ from the position $Z_{11}$. The controller 20 repeats the above processing until the position matches with or becomes behind the current position. In FIG. 3A, the reference vehicle speed at the current position (or a position closest to the current position) is indicated as $V_0$.

As described above, when the reference vehicle speed is determined at Step S120, the controller 20 judges whether or not the current vehicle speed is less than or equal to the reference vehicle speed at the current position (Step S130). If it is not judged that the current vehicle speed is less than or equal to the reference vehicle speed at the current position at Step S130, the controller 20 changes the length of the first section to be longer and sets the target charging electric power for the first section to the maximum charging electric power and the target charging electric power for the second section to the continuous charging electric power (Step S135). That is, if it is not judged that the current vehicle speed is less than or equal to the reference vehicle speed at the current position, it is not possible to reduce the vehicle speed to the target vehicle speed at the target position when setting the target charging electric power for the first section to the maximum charging electric power and the target charging electric power for the second section to the continuous charging electric power as determined at Step S120 and generating the regeneration brake.

In the present example, by extending the length of the first section where the maximum charging electric power is set as the target charging electric power, the target charging electric power that enables to reduce the vehicle speed to the target vehicle speed at the target position is set. Specifically, the controller 20 determines the transition of the vehicle speed when the vehicle traveling at the current vehicle speed at the current position is decelerated by generating the regeneration brake that charges the battery 45 with the maximum charging electric power, and defines the position where the vehicle speed matches with or becomes less than the reference vehicle speed as an end position of the first section $Z_{1e}$.

Figure 4A:
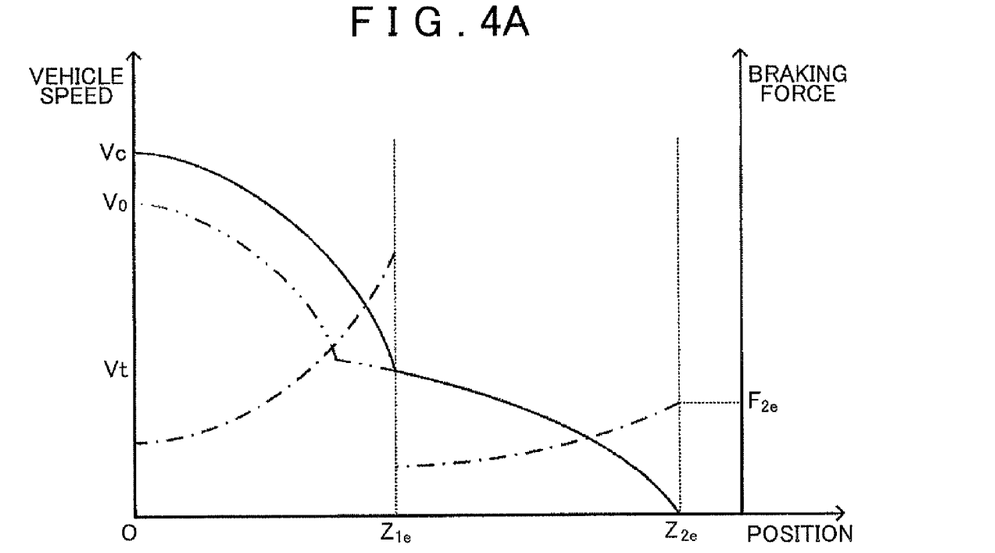
FIG. 4A is a view showing a transition of vehicle speed and FIG. 4B is a view showing a transition of charging electric power.

FIG. 4A is a view explaining a determination procedure of the length of the first section in case that a relation between the current position and the target position is the same as that in FIG. 3A. As shown in FIG. 4A, the current vehicle speed at the current position is Vc. When generating the regeneration brake that charges the battery 45 with the maximum charging electric power Pm after the current position, the braking force at the current position is $(-Pm/Vc)$. The controller 20 considers that an acceleration $a_c$ operated on the vehicle in this status is $(-Pm/(Vc \cdot M))$ (N). Further, the controller 20 considers that the position of the vehicle in the unit of time is a position $Z_{01}$ (not shown) that is located by $(Vc \times T)$ (m) ahead of the current position, and the vehicle speed $Vc_1$ at the position $Z_{01}$ is $(Vc+((-Pm/(Vc \cdot M)) \times T)$ (km/h). According to such processing, the braking force at the position $Z_{01}$ that is located by $(Vc \times T)$ (m) ahead of the current position can be determined as $(-Pm/Vc_1)$ and an acceleration $a_{c1}$ can be determined as $(-Pm/(Vc_1 \cdot M))$. The controller 20 repeats the above processing until the vehicle speed matches with the reference vehicle speed of the second section that is shown in FIG. 3A (or the vehicle speed becomes less than or equal to the reference vehicle speed of the second section).

Figure 4B:
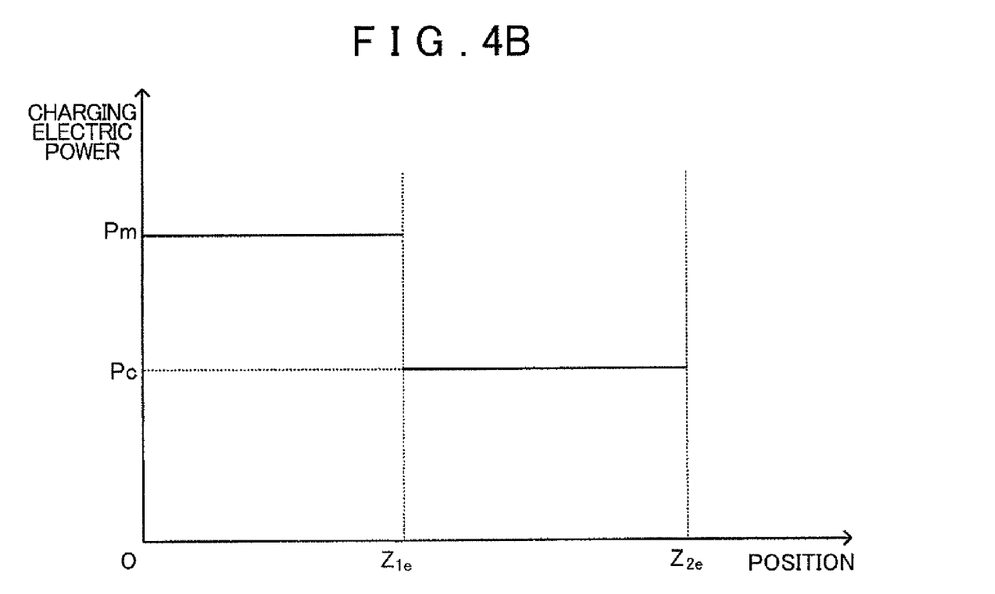

In FIG. 4A, the position where the vehicle speed matches with the reference vehicle speed of the second section when reducing the vehicle speed by generating the regeneration brake that charges the battery 45 with the maximum charging electric power Pm from the current position, is defined as the end position of the first section, which is indicated as $Z_{1e}$. In addition, in FIG. 4A, the reference vehicle speed behind the position $Z_{1e}$ is indicated with a dashed-two dotted line, the reference vehicle speed ahead of the position $Z_{1e}$ is indicated with a solid line, and the braking force is indicated with a dashed-dotted line. As described above, at Step S135, the controller 20 determines the lengths of the first section and the second section by changing the length of the first section that was determined at Step S120 and shortening the length of the second section at the same time. As shown in FIG. 4B, the target charging electric power for the first section is set to the maximum charging electric power Pm and the target charging electric power for the second section is set to the continuous charging electric power Pc.

The controller 20, by the processing of the deceleration control part 21c, performs deceleration control by outputting the control signal that controls the electric generator 44 so as to charge the battery 45 with the maximum charging electric power in the course of traveling the first section and outputting the control signal that controls the electric generator 44 so as to charge the battery 45 with the continuous charging electric power in the course of traveling the second section (Step S140). As a result, it is possible to perform control such that the vehicle speed becomes the target vehicle speed by decelerating the vehicle, as shown by the solid line in FIG. 4A, in the course of the vehicle traveling from the current position to the target position. As described above, according to the processing indicated at Steps S135 and S140, the current position of the vehicle when it has been judged that the throttle is off at Step S110 is defined as the deceleration start position. Further, the deceleration control is performed in a state in which the section between the deceleration start position and the target position is divided into the first section and the second section and the target charging electric power for the respective sections is set to different electric power levels. Consequently, it is possible to collect energy while suppressing excessive increase of the braking force, compared to the configuration to reduce the vehicle speed to the target vehicle speed by generating the regeneration brake that charges the battery with a single level of the target charging electric power.

On the other hand, at Step S130, if it has been judged that the current vehicle speed is less than or equal to the reference vehicle speed at the current position, the controller 20 sets the electric power for reducing the current vehicle speed to the intermediate target vehicle speed as the target charging electric power for the first section, and sets the target charging electric power for the second section to the continuous charging electric power (Step S145). That is, if it has been judged that the current vehicle speed is less than or equal to the reference vehicle speed of the current position, it is possible to reduce the vehicle speed to the target vehicle speed at the target position by setting the target charging electric power for the first section that was determined at Step S120 to the maximum charging electric power or less and generating the regeneration brake.

In the present example, the target charging electric power for the first section is set to the maximum charging electric power or less. Specifically, the controller 20 determines the electric power for reducing the current vehicle speed to the intermediate target vehicle speed Vt in the first section. To determine the electric power, a predefined map is referred in the present example. That is, in the present example, the charging electric power required for reducing the current vehicle speed to a specific intermediate target vehicle speed Vt is previously determined for each of the distance between the current position and the end position of the first section and the value of the current vehicle speed Vd and defined as a map.

Figure 5A:
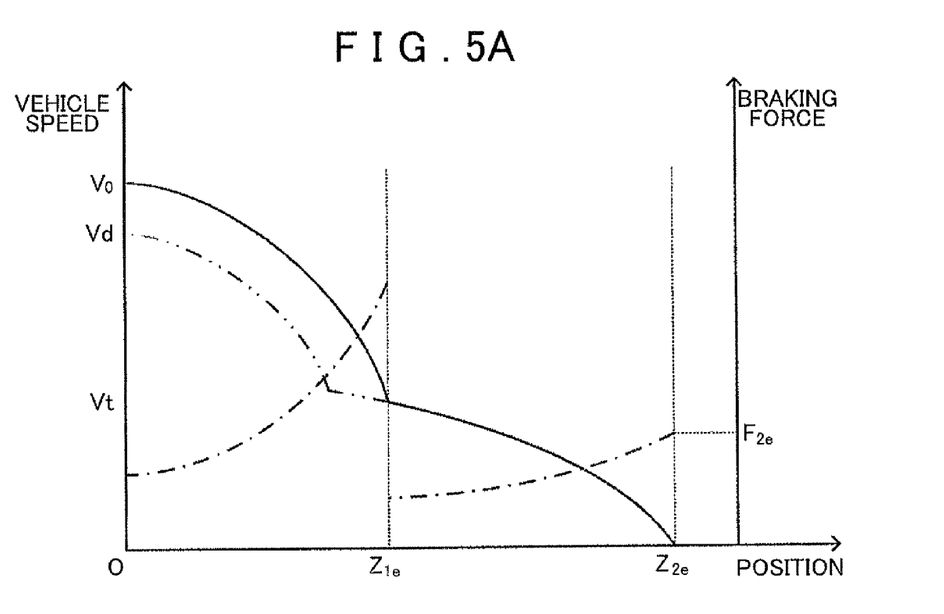
FIG. 5A is a view showing a transition of vehicle speed and FIG. 5B is a view showing a transition of charging electric power.
Figure 5B:
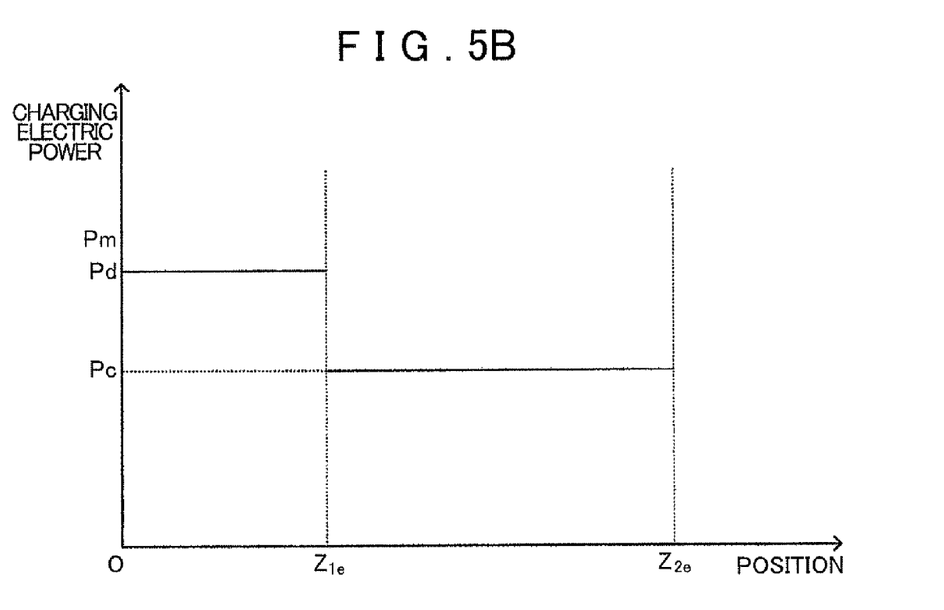

FIG. 5A is a view explaining a determination procedure of the target charging electric power for the first section in case that the relation between the current position and the target position is the same as that in FIG. 3A. FIG. 5B is a view explaining the target charging electric power corresponding to FIG. 5A. At Step S145, the controller 20 determines the distance between the current position and the end position $Z_{1e}$ of the first section that was determined at Step S120, determines the current vehicle speed Vd, and refers to the map to determine a charging electric power Pd corresponding to the distance and the current vehicle speed Vd. Then, the controller 20 sets the determined charging electric power Pd as the target charging electric power for the first section. In addition, the controller 20 sets the deceleration start position to the current position and sets the target charging electric power for the second section to the continuous charging electric power Pc.

Next, the controller 20, by the processing of the deceleration control part 21c, performs deceleration control by outputting the control signal to control the electric generator 44 so as to charge the battery 45 with the electric power Pd in the course of traveling the first section after the deceleration start position, and outputting the control signal to control the electric generator 44 so as to charge the battery 45 with the continuous electric power Pc in the course of traveling the second section (Step S150). As a result, it is possible to perform control such that the vehicle speed becomes the target vehicle speed by decelerating the vehicle, as shown by the solid line in FIG. 5A, in the course of the vehicle traveling from the current position to the target position. As described above, according to the processing indicated at Steps S145 and S150, the target charging electric power is set such that the vehicle speed at the deceleration start position is reduced to the intermediate target vehicle speed in the first section and the intermediate target vehicle speed is reduced to the target vehicle speed in the second section. Consequently, it is possible to collect the energy while suppressing excessive increase of the braking force, compared to when reducing the vehicle speed to the target speed by generating the regeneration brake that charges the battery with a single level of the target charging electric power.

III. Other Examples and Variations

Other examples of the inventive principles described herein can be implemented incorporating one or more of the variations discussed below provided that different levels of the target charging electric power are set to the respective sections forming the plurality of sections and the vehicle is braked by the regeneration brake in the respective sections. For example, the target vehicle speed is not limited to 0 km/h, and the vehicle speed may be larger than 0 km/h. In addition, the target position is not limited provided that it is the position on the road where the vehicle speed should be the target vehicle speed or less. The target position may be a start position of a low-traffic section where the vehicle should be traveled at a certain vehicle speed or less. Various configurations can be applied. Further, the target position may be dynamically changed. For example, the target vehicle speed may be determined according to a signal indicated by a traffic light and a stop line corresponding to the traffic light may be set as the target position if the vehicle should be stopped.

Further, the plurality of sections are only necessary to be set between the deceleration start position and the target position. The lengths of the respective sections and the target charging electric power for the respective sections are only necessary to be set such that the vehicle speed can be reduced to the target vehicle speed in a condition where the maximum value of the braking force becomes smaller compared to when generating the regeneration brake that charges the battery with a single level of the target charging electric power. The deceleration start position is only necessary to be a position to start deceleration by the regeneration brake in the vehicle. Therefore, the deceleration start position may be determined based on the distance to the target position. In addition, the number of divided sections is only necessary to be two or more. Therefore, the section may be divided into a predetermined number, the number of divided sections may be increased as the distance between the deceleration start position and the target position increases, or the section may be divided into the number as small as possible provided that the upper limit of a predetermined braking force is not exceeded.

The lengths of the first section and the second section are only necessary to be determined according to the distance between the deceleration start position and the target position. The inventive principles also can be realized by various kinds of configurations other than the above configuration. For example, if the distance between the deceleration start position and the target position is shorter than the distance required for reducing the vehicle speed to the target vehicle speed only with the braking force by the regeneration brake that charges the battery with the continuous charging electric power, the length of the first section may be defined with a minimum length required for performing the braking by the regeneration brake that charges the battery with the maximum charging electric power and the rest may be defined as the second section. In addition, if the battery can be cooled in the course of charging the battery with the continuous charging electric power, the length of the second section may be set such that temperature increased by charging the battery with the maximum charging electric power can be lowered in the course of charging the battery with the continuous charging electric power.

Further, the target charging electric power for the second section may be set to the charging electric power that the braking force to be operated on the vehicle at the target position becomes the upper limit of the braking force that does not give the driver the discomfort feeling when the braking force to be operated on the vehicle at the target position is operated on the vehicle at an end position of the braking operation. That is, the target position where the vehicle speed becomes the target vehicle speed is the end position of the braking operation where the vehicle speed becomes the lowest due to the braking by the regeneration brake. The braking force operated on the vehicle at the end position of the braking operation gives the driver the discomfort feeling more than the braking force operated on the vehicle in the course of the braking operation. Therefore, the upper limit of the braking force that is allowed for providing the vehicle that offers a comfortable ride is smaller at the end position of the braking operation compared to in the course of the braking operation. Thus, the braking operation is configured to be finished in a state where the braking force at the target position becomes the target braking force, which is defined with the upper limit of the braking force that does not give the driver the discomfort feeling when being operated on the vehicle at the end position of the braking operation.

Such configuration may be applied by for example setting the target braking force Ft at the target position to an upper limit of the braking force that does not give the driver the discomfort feeling and the vehicle speed at the target position to a predetermined vehicle speed $V_{2e}$ (for example, 1 km/h) that is quite close to 0, and determining the target charging electric power for the second section by the product of Ft and $V_{2e}$. According to this configuration, it is possible to provide the vehicle that offers the comfortable ride. In addition, the target braking force Ft may be smaller than the upper limit of the braking force that does not give the driver the discomfort feeling. Further, the upper limit can be determined for example by performing an experiment toward a sufficient number of drivers.

Further, in the above example, the braking force at a border between the first section and the second section changes in a discontinuous manner. Therefore, the braking force to be operated on the vehicle at the end position of the first section may be set to a predetermined value $F_{max}$(N) in order not to give the driver the discomfort feeling due to the occurrence of the discontinuous change. This configuration can be realized for example by performing the following processing instead of Steps S120 to S150.

Figure 6A:
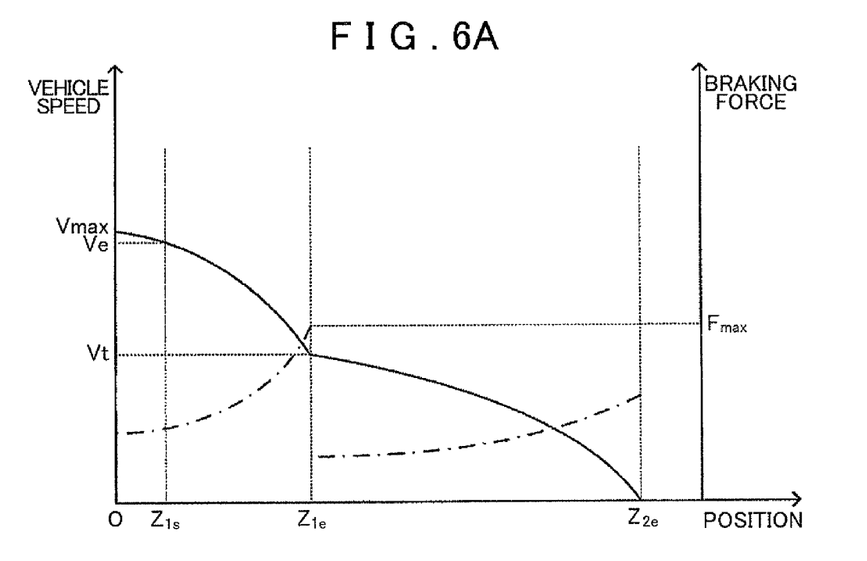
FIG. 6A is a view showing a transition of vehicle speed and FIG. 6B is a view showing a transition of charging electric power.
Figure 6B:
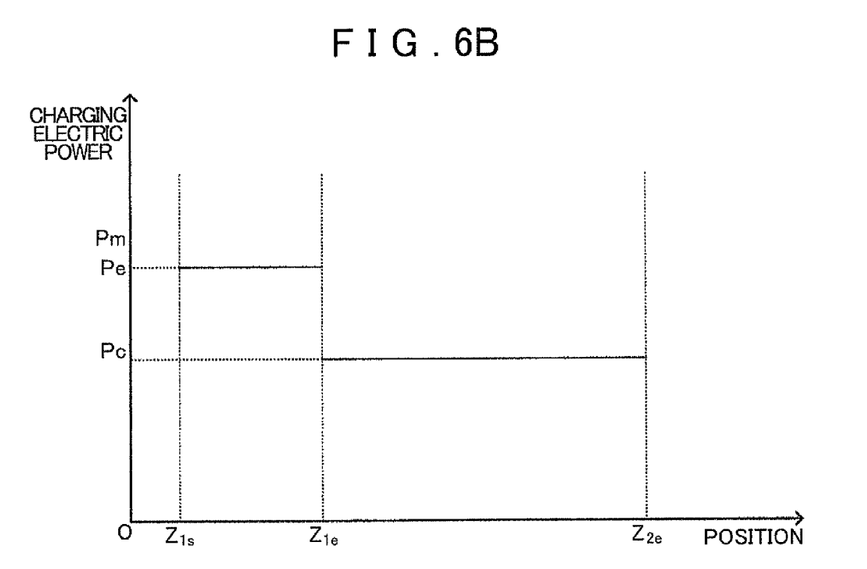

In this processing, the controller 20 firstly acquires the predetermined value $F_{max}$, determines the position $Z_{1e}$ by the same processing as Step S120, and defines $F_{max}$ as the braking force at the position $Z_{1e}$. In the present example, the target charging electric power for the second section is described with the continuous charging electric power Pc. However, the target charging electric power for the second section may be a predetermined value, or the charging electric power that is set based on the target braking force Ft at the target position. The vehicle speed calculated as the vehicle speed corresponding to the position $Z_{1e}$ is the intermediate target vehicle speed Vt. Therefore, the controller 20 determines a charging electric power Pe at the position $Z_{1e}$ as (an absolute value of $Vt \times F_{max}$) (W). In the present example, the charging electric power Pe is defined as the electric power for reducing the current vehicle speed to the intermediate target vehicle speed Vt, and set as the target charging electric power for the first section as shown in FIG. 6B.

Next, the controller 20 considers an acceleration $a_c$ operated on the vehicle at the position $Z_{1e}$ as $F_{max}/M$ (N). Further, the controller 20 calculates the vehicle speed Ve1 at the unit of time before from the position $Z_{1e}$ in a state of charging the battery with the target charging electric power Pe as $Vt+(-T) \times (F_{max}/M)$ (km/h). In addition, the controller 20 determines the position of the vehicle at the unit of time before using the position $Z_{1e}$ as a reference position as a position $Ze_1$ that is the position backward in relation to the travel direction by a distance $Ve_1 \times T$ (m) from the position $Z_{1e}$ (not shown). As a result, the vehicle speed at the position $Ze_1$ is determined as $Ve_1$, and the controller 20 determines the braking force $Fe_1$ at the position $Ze_1$ as $(-Pe/Ve_1)$ (N).

Further, the controller 20 considers an acceleration $ae_1$ to be operated on the vehicle at the position $Ze_1$ as $(-Pe/(Ve_1 \cdot M))$, and determines a vehicle speed $Ve_2$ at the unit of time before from the status at $Ze_1$ as $Ve_1+(-T) \times (-Pe/(Ve_1 \cdot M))$. In addition, the controller 20 determines the position of the vehicle at the unit of time before as a position $Ze_2$ that is the position backward in relation to the travel direction by a distance $Ve_2 \times T$ (m) from the position $Ze_1$. The controller 20 repeats the above processing until the position calculated as the position of the vehicle at the unit of time before matches with or becomes behind the original point O as the current position of the vehicle. In FIG. 6A, the position where the vehicle speed calculated by the above processing matches with the current vehicle speed Ve (or becomes equal to or more than the current vehicle speed Ve) is indicated with $Z_{1s}$, and the vehicle speed of when the position of the vehicle at the unit of time before matches with the original point O that is the current position of the vehicle (or becomes behind the original point O that is the current position of the vehicle) is indicated with Vmax.

In addition, in FIG. 6A, the vehicle speed calculated by the above processing ($Ve_2$ and the like) and the vehicle speed determined by the same processing as Step S120 for the section ahead of the position $Z_{1e}$ is indicated with a solid line, and the braking force is indicated with a dashed-dotted line. As indicated above, when the vehicle speed Vmax and the position $Z_{1s}$ are determined, the controller 20 judges whether or not to perform the deceleration control. That is, if the current vehicle speed Ve at the current position of the vehicle is equal to or more than Vmax, it is not possible to set the position $Z_{1s}$ at a position ahead of the current position. Therefore, the controller 20 does not perform the deceleration control. On the other hand, if the vehicle speed Ve is smaller than Vmax, the controller 20 sets the position $Z_{1s}$ that is the position where the vehicle speed calculated as described above matches with the current vehicle speed Ve as the start position of the first section, that is, the deceleration start position, and sets the target charging electric power for the first section to Pe. In addition, the controller 20 sets the target charging electric power for the second section to the continuous charging electric power Pc.

The controller 20, by the processing of the deceleration control part 21c, performs the deceleration control by maintaining the vehicle speed in the course of traveling to the deceleration start position, outputting the control signal that controls the electric generator 44 so as to charge the battery 45 with the electric power Pe in the course of traveling the first section after the deceleration start position, and outputting the control signal that controls the electric generator 44 so as to charge the battery 45 with the continuous charging electric power Pc in the course of traveling the second section.

In the above processing, the target charging electric power for the first section is set such that the braking force of when the vehicle speed becomes the intermediate target vehicle speed Vt matches with the predetermined value $F_{max}$. Consequently, according to this configuration, it is possible to suppress the braking force of when the vehicle speed becomes the intermediate target vehicle speed to the predetermined value $F_{max}$ or less, whereby it is possible to provide the vehicle that offers the comfortable ride. Here, the predetermined value $F_{max}$ is not limited provided that it is the braking force of when the vehicle speed becomes the intermediate target vehicle speed and does not give the driver the discomfort feeling. The predetermined value $F_{max}$ can be determined for example by performing an experiment toward a sufficient number of drivers. The braking force of when the vehicle speed becomes the intermediate target vehicle speed Vt is only necessary to be less than or equal to the predetermined value $F_{max}$. The target charging electric power for the first section may be set such that the braking force of when the vehicle speed becomes the intermediate target vehicle speed Vt becomes less than or equal to the predetermined value $F_{max}$.

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A driving support device, comprising:
a controller configured to:
  determine a target position ahead of a vehicle and a target vehicle speed at the target position;
  divide a section between a deceleration start position to start deceleration of the vehicle and the target position into a plurality of sections;
  set target charging electric power to different values for respective sections forming the plurality of sections to reduce a speed of the vehicle to the target vehicle speed at the target position; and
  control an electric generator installed in the vehicle to:
    generate a regeneration brake in the respective sections forming the plurality of sections based on the set target charging electric power values; and
    charge the battery with the target charging electric power generated in each of the respective sections.

2. The driving support device according to claim 1, wherein the controller is configured to:
set the target charging electric power value to be larger for one of the plurality of sections that is positioned closer to the deceleration start position than the set target charging electric power value for one of the plurality of sections that is positioned closer to the target position.

3. The driving support device according to claim 2, wherein the controller is configured to:
divide the section between the deceleration start position and the target position into a first section and a second section being located ahead of the first section;
set the target charging electric power for the first section to maximum charging electric power with which the battery can be charged; and
set the target charging electric power for the second section to continuous charging electric power with which the battery can be continuously charged without degrading performance of the battery.

4. The driving support device according to claim 3, wherein the controller is configured to:
determine a current vehicle speed;
acquire a preset reference vehicle speed;
determine whether the current vehicle speed is greater than the reference vehicle speed;
if the current vehicle speed is greater than the reference vehicle speed, lengthen the first section and shorten the second section; and if the current vehicle speed is less than or equal to the reference vehicle speed, change the target charging electric power for the first section to a power level for reducing the current vehicle speed to an intermediate vehicle speed.

5. The driving support device according to claim 1, further comprising:
a memory storing map data;
wherein the controller is configured to determine the location of the target position based on the stored map data.

6. The driving support device according to claim 1, wherein the controller is configured to:
access a maximum braking force that is determined as a maximum braking force that can be applied without causing a driver a discomfort feeling; and
control the electric generator to generate the regeneration brake in a manner that a braking force of the regeneration brake does not exceed the maximum braking force.

7. A navigation device comprising the driving support device of claim 1.

8. A driving support method, comprising:
a controller determining a target position ahead of a vehicle and a target vehicle speed at the target position;
the controller dividing a section between a deceleration start position to start deceleration of the vehicle and the target position into a plurality of sections;
the controller setting target charging electric power to different values for respective sections forming the plurality of sections to reduce a speed of the vehicle to the target vehicle speed at the target position; and
the controller controlling an electric generator installed in the vehicle to:
  generate a regeneration brake in the respective sections forming the plurality of sections based on the set target charging electric power values; and
  charge the battery with the target charging electric power generated in each of the respective sections.

9. The driving support method according to claim 8, further comprising:
the controller setting the target charging electric power value to be larger for one of the plurality of sections that is positioned closer to the deceleration start position than the set target charging electric power value for one of the plurality of sections that is positioned closer to the target position.

10. The driving support method according to claim 9, further comprising:
the controller dividing the section between the deceleration start position and the target position into a first section and a second section being located ahead of the first section;
the controller setting the target charging electric power for the first section to maximum charging electric power with which the battery can be charged; and
the controller setting the target charging electric power for the second section to continuous charging electric power with which the battery can be continuously charged without degrading performance of the battery.

11. The driving support method according to claim 10, further comprising:
the controller determining a current vehicle speed;
the controller acquiring a preset reference vehicle speed;
the controller determining whether the current vehicle speed is greater than the reference vehicle speed;
the controller lengthening the first section and shortening the second section when the current vehicle speed is greater than the reference vehicle speed; and the controller changing the target charging electric power for the first section to a power level for reducing the current vehicle speed to an intermediate vehicle speed when the current vehicle speed is less than or equal to the reference vehicle speed.

12. The driving support method according to claim 8, further comprising:
the controller determining the location of the target position based on map data stored in a memory.

13. The driving support method according to claim 8, further comprising:
the controller accessing a maximum braking force that is determined as a maximum braking force that can be applied without causing a driver a discomfort feeling; and
the controller controlling the electric generator to generate the regeneration brake in a manner that a braking force of the regeneration brake does not exceed the maximum braking force.

14. A non-transitory computer-readable storage medium storing a computer executable driving support program, the program comprising:
instructions for determining a target position ahead of a vehicle and a target vehicle speed at the target position;
instructions for dividing a section between a deceleration start position to start deceleration of the vehicle and the target position into a plurality of sections;
instructions for setting target charging electric power to different values for respective sections forming the plurality of sections to reduce a speed of the vehicle to the target vehicle speed at the target position; and
instructions for controlling an electric generator installed in the vehicle to:
generate a regeneration brake in the respective sections forming the plurality of sections based on the set target charging electric power values; and
charge the battery with the target charging electric power generated in each of the respective sections.

15. The storage medium according to claim 14, the program further comprising:
instructions for setting the target charging electric power value to be larger for one of the plurality of sections that is positioned closer to the deceleration start position than the set target charging electric power value for one of the plurality of sections that is positioned closer to the target position.

16. The storage medium according to claim 15, the program further comprising:
instructions for dividing the section between the deceleration start position and the target position into a first section and a second section being located ahead of the first section;
instructions for setting the target charging electric power for the first section to maximum charging electric power with which the battery can be charged; and
instructions for setting the target charging electric power for the second section to continuous charging electric power with which the battery can be continuously charged without degrading performance of the battery.

* * * * *